Patented Sept. 2, 1930

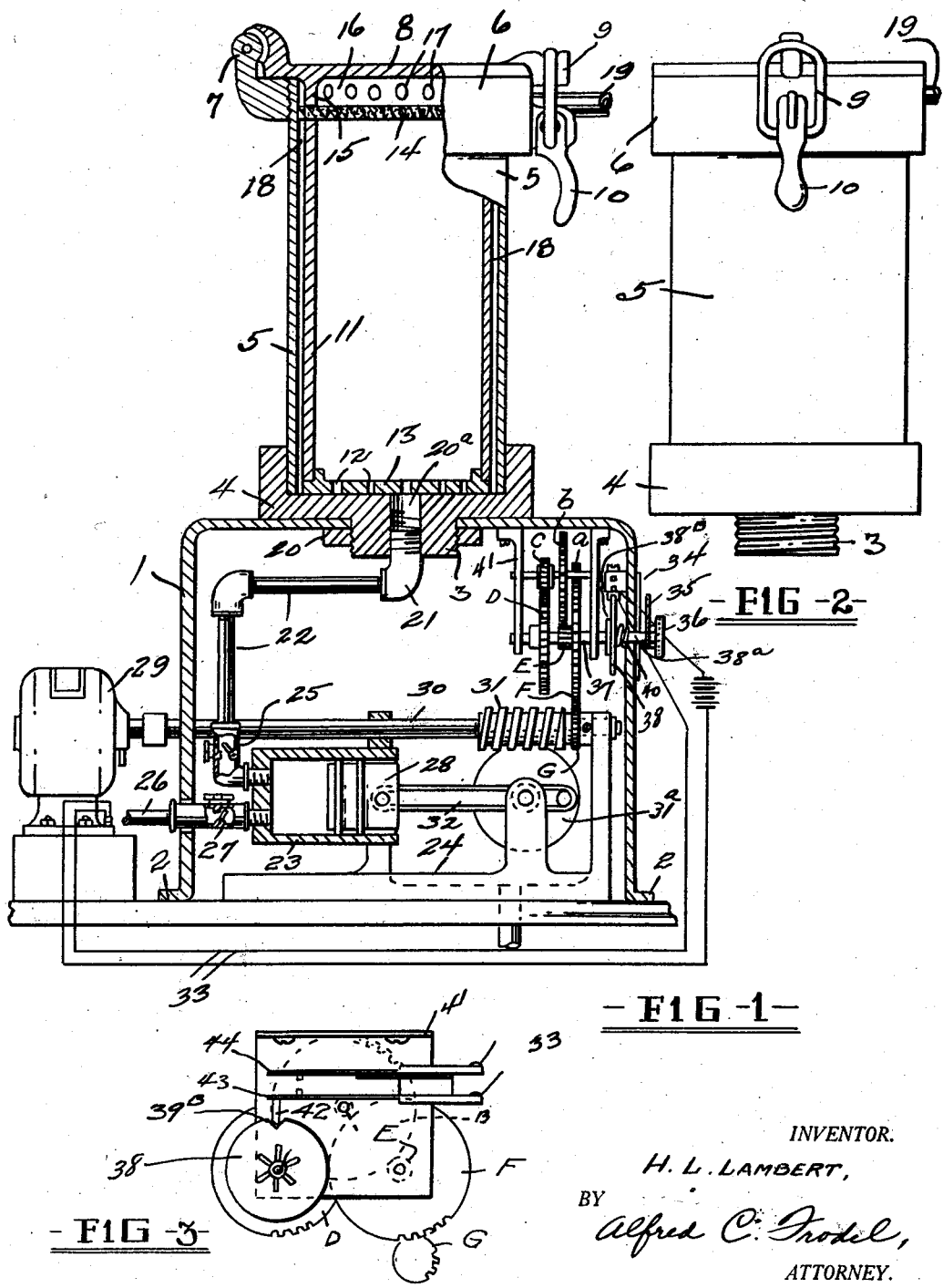

1,774,980

UNITED STATES PATENT OFFICE

HARRY L. LAMBERT, OF NORTH BERGEN, NEW JERSEY

COFFEE-MAKING MACHINE

Application filed September 5, 1929. Serial No. 390,533.

My present invention, in its broad aspect, has reference to improvements in apparatus for making coffee of the type which is motor operated, time or quantity controlled, and capable of making coffee in relatively large quantities, say five or ten gallons at a time, for use in restaurants and the like. More particularly it is my purpose to provide a device of this character which is simple and durable in construction, largely automatic in its operation and control, and effective in the practical production of coffee beverage of high grade. A special purpose of my present apparatus is to greatly improve upon the quality of the coffee beverage thus produced.

In order that the functions and purposes of my present invention may be better understood, it is pointed out that the coffee bean, when roasted, contains among other things, two products or constituents. One of these is caffeine, and it is this element that produces the delightful, pleasing coffee taste that appeals to all coffee drinkers, and the greater the percentage of caffeine extracted when the coffee is brewed the better the resulting beverage; the desirable end to be obtained is the complete extraction of caffeine from the roasted bean. The other element is tannin, which has a stinging, bitter and undesirable taste and should be eliminated as far as possible from the resulting brew or beverage. It has been estimated that the average cup of coffee served contains about 1.70 grains of caffeine and 2.30 grains of tannin. A very good cup of coffee is estimated to contain about 2.20 grains of caffeine and .30 grains of tannin. Caffeine is much more active than tannin, and more easily extracted, and under proper conditions almost all of the caffeine in the beans can be extracted, and a very small percentage of tannin, the undesirable element. Caffeine responds quickly to boiling water, while tannin is very slow acting, but continues to be extracted slowly from the grounds as long as the grounds are in water, no matter at what temperature; thus, if all the coffee grounds or sediment is not removed from the coffee as soon as the beverage or brew is completed, the tannin will continue to be active even after the coffee has been consumed. The production of the ideal cup of coffee therefore has been found to depend on; first the use of boiling water at about 212° F.; second, the recovery of all caffeine; third, reduction in recovery of tannin as much as is possible, and; fourth, absolute elimination of all grounds and sediment from the resulting brew or beverage. The production of an ideal beverage is not as simple as it may seem, since as far as I am aware none of the present methods and apparatus serves to eliminate all grounds and sediment.

My present apparatus for producing a coffee beverage contemplates the provision of an outer and an inner receptacle; the inner receptacle containing the coffee to be brewed or distilled. Hot water at about 212° Fahrenheit is forced by automatic means through the receptacle containing the coffee in a direction from the bottom up through the top of the receptacle. Over the top is placed a filtering means which seals the grounds and sediment in the coffee container and permits only pure liquid with the desired coffee flavor, caffeine, and but a slight trace of tannin to pass through. This liquid or beverage is drawn off at the top. The outer receptacle is an enclosure and is seated on a base beneath which is power driven means for pumping the hot water. A time or quantity controlled device is provided for turning off the power to stop the flow of water when the desired amount of coffee has been produced.

Among the principal advantages of my invention may be briefly defined the following; first, my power driven means for forcing the hot water through the coffee is positive and sure in operation and concealed within the apparatus to be out of the way, free from dust, and the like; second, the hot water is forced through the ground coffee in an upward direction, and the path of flow is intercepted by a filtering device which prevents the passage of grounds and sediment; third, positive and automatic means are provided for controlling the flow and quantity of water through the coffee grounds; fourth, the device may be quickly and easily taken apart for filling, cleaning and repairing, all of the parts being readily accessible; fifth, the services of a skilled mechanic are not necessary to setting up my apparatus and operating it, and; sixth, my apparatus may be operated and very fine coffee made without the utilization of special skill in the making of coffee, or special familiarity with kitchen utensils and mechanics. Furthermore my apparatus can be manufactured and sold at a relatively moderate price and is not liable to become out of order.

Other and equally important objects of my invention will become apparent as the description of the same proceeds in greater detail, but interpretation of the scope of the invention should only be conclusive when made in the light of the subjoined claims.

In the drawings wherein I have illustrated a preferred form of my invention;—

Figure 1 is a vertical section of the assembly,

Figure 2 is an elevation of the container, and

Figure 3 is a detail of the control mechanism for the motor and pump.

In the drawings wherein like characters of reference are used throughout the several views to designate like or similar parts;—

The numeral (1) designates the hollow base of my apparatus which may be formed of cast iron, sheet metal or the like and which is supported on a supporting flange or feet (2); the base may have an opening and door for access thereto, but same are not shown. The top of the base has an opening therein through which extends the screwthreaded boss (3) of a flanged base element (4) for the cylindrical up-standing outer container (5); the top of the container (5) is rimmed as at (6) and has a hinge assembly (7) for a cover (8). The cover is held down by a link and toggle latch (9) having a handle (10). Within the outer container (5) is an inner container or cartridge (11) which has a foraminated bottom plate, or bottom plate provided with holes (12), said bottom plate being designated (13). In this container or cartridge is placed the coffee grounds (not shown) from which the resulting coffee beverage is made. Over the top of the container or cartridge (11) is a filtering device or sheet (14) which is held in place by the downwardly extending annular flange (15) of the cover or cap (8) when the same is closed. Thus the flange forms a chamber (16) above the filter member, and the flange has a plurality of openings (17) leading to the space between the inner and outer receptacles and cover (8), said space being designated by (18), an outlet pipe or connection (19) to a receiving reservoir (not shown) for coffee beverage is tapped into the cap to communicate with the space (18).

As stated, the boss (3) extends through the opening in the top of the base, and is held in place by a nut (20) to firmly mount and connect the container on the base. Tapped into an opening (20$^a$) in the boss is an elbow (21); the opening leads to the interior of container (11) as shown in Figure 1, and the elbow is connected to a pipe line (22) leading to a pumping cylinder (23) mounted on a frame (24) in the hollow base (1). A check valve (25) is interpolated in the pipe line so that the flow is directed only to the cartridge (11) and not back to the cylinder (23). Another pipe line (26) leads to a source of hot water supply (not shown) and has a check valve (27) adjacent its point of entrance into cylinder (23) so that hot water is pumped from the line (26) into the line (22) when the pump or piston head (28) is reciprocated. Preferably without the base (1) is an electric motor (29) having a shaft (30) carrying a spiral gear (31) which meshes with driven gear (31$^a$) actuating the crank or pitman (32) of the piston (28) so that when the motor is energized the pump is actuated to pump hot water into and through the cartridge (11).

The operation of my device or apparatus is as follows: the cartridge is lifted out of the outer container (5) and filled with the coffee grounds. It is then replaced, and the filter member (14) placed over it and the cap or cover latched down. The motor (29) is now started which reciprocated the piston (28) and draws hot water from the line (26) and forces it through pipe line (22) and thence up through the opening (20$^a$) through the foraminated base plate (12) and into and up through the coffee grounds in the receptacle (11), thence out through the filter member (14) into the space or chamber (16). From the chamber the resulting fluid passes through openings (17) in flange (15) into the space (18) whence it is drawn off through pipe (19) to the coffee reservoir (not shown); the filter member absolutely prevents the passage of grounds and sediment; the action is so swift that very little tannin is absorbed by the fluid passing through the grounds; the grounds cannot stand and drip or impregnate the resulting beverage with undesirable by-products such as tannin, and a relatively large amount of very superior coffee can be brewed or distilled in a very short time.

In order that an exact volume of beverage may be automatically determined, I provide a control device for opening and closing the electric circuit (33) to the motor (29). This control element includes a plate (34) on the outside of the casing, a pointer (35) and a knob (36) on a shaft (38$^a$) carrying the pointer. The plate is graduated in gallons; on the shaft (38$^a$) is mounted a disc (38) which is notched at (39$^b$). The shaft (37) is connected by a train of gears designated $a$—$b$—$c$—$d$—$e$—$f$ with a gear on the motor shaft (30); a spring (40) is provided for tensioning the disc (38) against friction driving pin (38ᵇ) and the whole is supported in brackets or hanger (41) in the casing or base (1). When it is desired to start the motor the knob is turned to bring the pin (42) of one contact arm (43) out of the notch (39ᵇ) and on the periphery of disc (38) this closes the circuit with contact arm (44) to the motor, and the circuit continues closed until the pin (42) drops back into notch (39ᵇ) as the disc is gradually revolved by rotation of shaft (37) through gears a—b—c—d—e—f— from the motor drive shaft (30) when the circuit is broken and the motor ceases to operate. For example we will say that the pointer (35) has been turned to five gallons on the calibrated plate (34); this would turn the disc (38) five notches on the friction driving pin (38ᵇ) and would operate sufficiently to pump five gallons of water before the pin (42) would again drop into notch (39ᵇ); that being the case about five gallons of coffee will be made, and the control device will then again have to be set for the next pumping operation. As a usual thing the hot water is kept at a temperature about 212° F.

It is believed that the operation and advantages of my apparatus are apparent from the foregoing to one skilled in the art to which this invention relates, but special emphasis is again laid upon the fact that interpretation of the scope of the invention should only be conclusive when made in the light of the subjoined claims.

I claim:—

1. A coffee making apparatus, comprising a receptacle for the coffee grounds having an open top and a foraminated bottom, a hot water supply system leading into the base of the receptacle, a power driven pump interpolated in the system to force water up through the foraminated bottom and through the coffee grounds, a filter means over the open top of the receptacle and sealing the contents against exit of all but the liquid forced up through the receptacle by the pump, a tap leading off from above the filter, in combination with means for controlling the action of the pumping means to determine the amount of liquid passed through the coffee grounds.

2. A coffee making apparatus, comprising a receptacle for the coffee grounds having an open top and a foraminated bottom, a hot water supply system leading into the base of the receptacle, a pumping unit interpolated in the system to force water up through the foraminated bottom and through the coffee grounds, means for driving the pumping unit, a filter means over the open top of the receptacle and seated on the edges thereof and sealing the contents against exit of all but the liquid forced through the receptacle by the pump, an outer receptacle enclosing the first receptacle and having a cap forming a chamber above the filter means, a tap leading off from the chamber above the filter, in combination with means for controlling the action of the pump to determine the amount of liquid passed through the coffee grounds.

3. A coffee making apparatus, comprising a receptacle for coffee grounds having an open top and a foraminated bottom, a hollow base below the receptacle, a hot water supply system leading into the bottom of the receptacle, a power operated pumping unit in the hollow base and interpolated in the system, a filter means over the open top of the receptacle and seated on the edges thereof and sealing the contents against exit of all but the liquid forced through the receptacle by the pump, an outer receptacle enclosing the first receptacle and having a cap formed with a flange engaging the filter and forming a chamber above the filter means, a tap leading off from the chamber above the filter, in combination with means in the hollow base for controlling the action of the pump to determine the amount of liquid passed up through the coffee grounds in the receptacle.

4. A coffee making apparatus, comprising a receptacle for coffee grounds having an open top, a hollow base below the receptacle and supporting the same, a hot water system leading into the bottom of the receptacle, a power operated pumping unit interpolated in the system and contained in the hollow base, a filter over the open end of the receptacle, an outer receptacle enclosing the first receptacle and having a cap formed with a flange providing a chamber above the filter and clamping the filter means in place when the cap is closed, a tap leading off from the chamber above the filter, in combination with automatic means in the hollow base for controlling the action of the pump to determine the amount of liquid passed through the coffee grounds of the receptacle.

5. A coffee making apparatus, comprising a receptacle for coffee grounds having an open top, a hollow base below the receptacle and supporting the same, a hot water system leading into the bottom of the receptacle, a power operated pumping unit in the hollow base and interpolated in the system for forcing hot water through the receptacle from bottom to top and out through the top, a filter means over the open top of the receptacle, an outer receptacle enclosing the first receptacle and having a cap formed with a flange for holding the filter means in place over the top of the first receptacle, said flange forming a chamber above the filter means and having openings therein leading to a space between the inner and outer receptacles, a tap leading off from the space between the inner and outer receptacles at a point above the filter, and said inner container being so disposed with respect to the outer container that grounds in the inner container will not drain into the space between the inner and outer receptacles when the pump is not in operation.

6. A coffee making apparatus, comprising a receptacle for coffee grounds having an open top, a hollow base below the receptacle and supporting the same, a hot water system leading into the bottom of the receptacle, a power operated pumping unit in the hollow base and interpolated in the system for forcing hot water through the receptacle from bottom to top and out through the top, a filter means over the top of the receptacle, an outer receptacle enclosing the first receptacle having a hinged cap formed with a flange for holding the filter means in place over the top of the first receptacle when the cap is clamped down, said inner receptacle being removably mounted with respect to the base and outer receptacle, said flange forming a chamber above the filter means and having openings therein leading to a space between the inner and outer receptacles, a tap leading off from the space between the inner and outer receptacles at a point above the filter, and said inner container being so disposed with respect to the outer receptacle that grounds and sediment in the inner container will not drain into the space between the inner and outer receptacles when the pump is not in operation.

7. The apparatus as described in claim 6, in combination with automatic means for controlling the operation of the power driven pump for determining the amount of hot water pumped into and through the coffee grounds in the inner receptacle.

In testimony whereof, I affix my signature hereunto.

HARRY L. LAMBERT.